United States Patent [19]
DeLong et al.

[11] Patent Number: 5,190,250
[45] Date of Patent: Mar. 2, 1993

[54] AUTONOMOUS, HELIBORNE-MOBILE CONSTRUCTION/EMERGENCY POD SYSTEM

[75] Inventors: Denton DeLong, Trumbull; Richard Enders, Jr., Milford, both of Conn.

[73] Assignee: United Technologies Corporation, Hartford, Conn.

[21] Appl. No.: 754,787

[22] Filed: Sep. 4, 1991

[51] Int. Cl.$^5$ .............................................. B64C 1/22
[52] U.S. Cl. .............................. 244/137.1; 244/17.11; 244/118.1; 244/137.2; 254/279; 254/286
[58] Field of Search ............... 244/17.11, 137.4, 137.1, 244/118.5, 118.1, 137.2; 254/278, 279, 280, 286

[56] References Cited

U.S. PATENT DOCUMENTS

| | | | |
|---|---|---|---|
| 2,984,455 | 5/1961 | Fischer | 254/286 |
| 3,358,968 | 12/1967 | Walsh | 254/279 X |
| 3,778,011 | 12/1973 | Cannon | 244/118.1 X |
| 3,854,681 | 12/1974 | Hasquenoph | 244/118.1 |
| 4,042,066 | 8/1977 | Noone | 254/286 |
| 4,138,077 | 2/1979 | Okumura | 244/137.2 |
| 5,020,742 | 6/1991 | Haslim | 244/137.2 |

FOREIGN PATENT DOCUMENTS 2443757  3/1976  Fed. Rep. of Germany ...... 254/279

Primary Examiner—Joseph F. Peters, Jr.
Assistant Examiner—Christopher P. Ellis
Attorney, Agent, or Firm—Terrance J. Radke

[57] ABSTRACT

An autonomous, heliborne-mobile construction/emergency pod (AHP) system that is structurally and functionally designed and configured to efficiently and expeditiously deploy independently operable, self-contained equipment pods utilizing the operational capabilities provided by helicopters. The AHP system is configured for integration in combination with a helicopter external stores support station. The AHP system includes a dual cable winch and rack (DCWR) assembly and an equipment pod that is configured for provisioning remote and/or inaccessible locations with a full complement of mission specific power actuated equipment and a self-contained power source to facilitate extended mission operations without external support. The DCWR assembly includes a winch subassembly and a suspension rack that provides the mechanical and functional interface between the equipment pod and the winch subassembly and which is operative to lock the equipment pod in combination with the DCWR assembly for up-loading and recovery operations and to release the equipment pod from the DCWR assembly after deployment. The winch subassembly provides the mechanical and functional interface between the suspension rack and the external stores support station and is operative to deploy and recover the equipment pod, suspension rack combination. The AHP system may be used to deploy equipment pods with the helicopter in a hover flight mode or landed.

15 Claims, 4 Drawing Sheets

AUTONOMOUS, HELIBORNE-MOBILE CONSTRUCTION/EMERGENCY POD SYSTEM

FIELD OF THE INVENTION

The present invention is directed to self-contained, mobile equipment systems, and more particularly, to an autonomous, heliborne-mobile construction/emergency pod system that is structurally and functionally designed and configured to efficiently deploy independently operable equipment pods utilizing the operational capabilities provided by helicopters.

BACKGROUND OF THE INVENTION

Emergency/disaster situations are forever arising that require the implementation of response missions utilizing both specialized and commonplace equipment such as the "jaws of life", cutting torches, saws of various types, grinders, impact wrenches, etc., to resolve the situation. Such situations may include rescue and/or recovery operations involving downed aircraft, wrecked vehicles such as cars, trucks, buses, trains, disabled ships or boats, collapsed structures such as bridges, buildings, power lines, etc., as well as other disasters that may arise from natural phenomena such as earthquakes, hurricanes, floods, thunderstorms, high winds, etc.

The successful resolution of such response missions may be enhanced by the use of equipment that is power driven, e.g., electrical, pneumatic, and/or hydraulic actuated equipment. The effectuation of a response mission with a full complement of such power actuated equipment and the associated power supply generally entails the use of a transport-type ground vehicle such as a utility truck, van, flatbed trailer, etc, due to the overall weight and volume of the mission equipment.

It will be appreciated, however, that many emergency/disaster situations occur in locations that are remote and/or inaccessible or which are made inaccessible by the nature of the emergency or disaster. The inaccessibility and/or remoteness of such locations may severely impede (or totally preclude) the effectuation of suitably equipped response missions utilizing most types of ground vehicles. Thus, the inaccessibility and/or remoteness of such emergency/disaster locations may necessitate the implementation of response missions that are less than optimally equipped to respond to the situation if relying on ground transport. Moreover, the very nature of emergency/disaster situations generally requires that response missions be effectuated in minimum time. Equipment laden ground vehicles do not generally provide fast mission response times.

The foregoing factors militate against the use of ground vehicles as a means for responding to many emergency/disaster situations. Instead, there is a growing tendency to utilize airborne means to respond to such situations. While winged aircraft have the capability of very fast response times and the ability to access most inaccessible and/or remote locations (by overflying such locations), deployment (as well as recovery) of mission equipment and/or supplies is problematic. Winged aircraft may deploy emergency/disaster mission equipment and/or supplies by gravity and/or parachute drops, both methods being inherently unsuitable means for deployment of such loads. Gravity drops subject equipment and/or supplies to landing shocks and consequential damage while parachute drops are an inaccurate means of deploying equipment and/or supplies to a predetermined location.

Helicopters, in contrast, are well-suited for response missions to emergency/disaster situations due to their flight characteristics. Most helicopters have a load carrying capability that is sufficient to transport a full complement of power actuated mission equipment and any associated power source, and have relatively fast response times. More importantly, helicopters can readily access disaster locations which are remote and/or inaccessible to ground transport. Specifically, helicopters have the capability to maintain a hover flight mode over such disaster locations to deploy mission equipment as well as the capability to land mission equipment in confined areas. To date, the load carrying capability of helicopters, however, has not been optimally developed to fully utilize the unique flight characteristics of helicopters for emergency mission profiles.

Helicopters may transport loads either externally or internally. External loads may be transported on fixed stores stations (of the type utilized for missiles, bombs, or auxiliary fuel tanks) or by means of a cargo hook suspended beneath the helicopter along the centerline thereof. Each of these transport means, however, is limited in certain respects such that the advantages available from a helicopter are not fully exploited. External loads may be either gravity dropped from the stores station or off-loaded from a landed helicopter.

Equipment that is gravity dropped from a hovering helicopter will be subjected to landing shocks, although usually not to the extent experienced in drops from winged aircraft. Furthermore, there is no provision for recovering gravity dropped equipment. Equipment off-loading from the stores station of a landed helicopter generally requires ground support equipment due to the heavy nature of the equipment (initial up-loading also requires such ground support equipment) and such equipment will not generally be available at a disaster location. Moreover, the disaster location may not be suitable for landing even a helicopter.

Equipment transported by means of a suspended cargo hook must be on-loaded and off-loaded while the helicopter is in a hover flight mode due to the fixed length of the cargo hook sling. Rotor assembly downwash creates a certain hazard for personnel on-loading and/or off-loading the equipment. Moreover, the helicopter is restricted to one hover altitude during such operations which may increase pilot workload or limit the capability of the helicopter to off-load. In addition, the equipment suspended from the cargo hook severely limits the flight envelope of the helicopter such that the full flight characteristics of the helicopter may not be utilized to fly mission profiles. There is also a danger of injury from static electrical discharge to personnel off-loading equipment from a hovering helicopter.

Helicopters may also transport loads internally, although the volume and/or weight of equipment and/or supply loads that may be transported internally is limited by helicopter cabin volume and the number of mission personnel that must be concomitantly transported. Internally transported loads may be off-loaded either from a landed helicopter or from a helicopter in the hover flight mode utilizing a door mounted winching system. Off-loading equipment from a landed helicopter is a time consuming and labor intensive operation, and needlessly idles the helicopter during such off-loading operations. Moreover, the disaster location may not be suitable for landing even a helicopter.

Current winching systems do not have the capability to handle heavy loads (design capability of about 600 pounds), and therefore must incrementally off-load mission equipment and/or supplies, which is a time consuming procedure and unnecessarily ties up the helicopter and which may increase pilot workload (to maintain hover flight conditions). The winching procedure calls for individual loads to be attached to the winching system in the helicopter cabin, swung out to an external position clear of the helicopter, and then winched down to the ground. Increases in size, weight, and/or volume of the individual items comprising the load makes the procedure more laborious and time consuming. Furthermore, current winching systems employ an electric fail-safe brake to control load down winching that has a tendency to burn out from extensive use. In addition, winched loads are not stabilized for oscillatory and/or twisting movements, and may be subjected to the static charge buildup of the hovering helicopter.

Many of the considerations described in the preceding paragraphs are also relevant to the utilization of the operational capabilities provided by helicopters to efficiently deploy independently operable equipment pods in construction and/or demolition mission profiles, especially in combat environments. Typical combat mission profiles include both combat construction and combat demolition. Due to the potentially hazardous nature of such mission profiles, it is imperative that the helicopter have the capability to utilize its entire flight envelope, including nap-of-the-earth flight operations and that the equipment pod be efficiently and expeditiously deployed and/or recovered.

A need exists for a mission equipment system that is structurally and functionally compatible for use with a helicopter. The mission equipment system should be designed and configured to exploit the full flight capabilities provided by helicopters. The mission equipment package system should have the capability to deploy a full complement of mission equipment and any associated power source(s) and/or supplies utilizing either the hover flight mode or when landed.

SUMMARY OF THE INVENTION

One object of the present invention is to provide an autonomous, heliborne-mobile construction/emergency pod (AHP) system that is structurally and functionally designed and configured to efficiently deploy independently operable equipment pods utilizing the operational capabilities of helicopters.

Another object of the present invention is to provide an AHP system that is structurally and functionally configured for integration in combination with a helicopter external stores support station.

Still another object of the present invention is to provide an AHP system that is structurally and functionally configured for integration in combination with a helicopter external stores support station so that the helicopter may fly a normal flight envelope, including nap-of-the-earth flight operations.

Yet another object of the present invention is to provide an AHP system having an equipment pod that is configured for provisioning of remote and/or inaccessible locations with a full complement of mission specific power actuated equipment and a self-contained power source to facilitate extended mission operations without external support.

One more object of the present invention is to provide an AHP system having the capability to deploy an equipment pod from a helicopter in a hover flight mode or a landed helicopter.

Still one more object of the present invention is to provide an AHP system having the capability to facilitate up-loading of an equipment pod prior or subsequent to the execution of a mission profile.

Yet one more object of the present invention is to provide an AHP system having the capability to automatically damp any oscillatory and/or twisting motions of the equipment pod during deployment or recovery.

A further object of the present invention is to provide an AHP system having the capability for emergency jettisoning of the equipment pod.

Still a further object of the present invention is to provide an AHP system having the capability to lock the equipment pod in secured combination with the helicopter.

Yet a further object of the present invention is to provide an AHP system wherein the equipment pod is electrically isolated from helicopter static electricity charge buildup.

These and other objects are provided by an autonomous, heliborne-mobile construction/emergency pod (AHP) system according to the present invention that includes an equipment pod and a dual cable winch and rack (DCWR) assembly. The AHP system of the present invention is configured to optimally utilize the characteristics and capabilities of helicopters to efficiently and expeditiously deploy a full complement of mission specific equipment and any associated self-contained power unit and/or supplies for a wide variety of emergency mission profiles. The AHP system of the present invention also has utility for construction and/or demolition mission profiles including the provisioning of construction and/or demolition operations in combat zones.

More specifically, the equipment pod is configured to facilitate provisioning of remote and/or inaccessible locations with a full complement of mission specific equipment and/or supplies as well as a self-contained power source that provides the capability for extended, autonomous emergency or construction mission operations without external support.

The DCWR assembly provides the structural and functional interface between the equipment pod and the helicopter, and is configured to: (1) facilitate uploading of the equipment pod in combination with the helicopter with minimal ground support personnel and equipment; (2) lock the equipment pod in secured combination with the helicopter such that the helicopter may fly a normal flight envelope, including nap-of-the earth flight operations; (3) facilitate downloading and/or recovery of the equipment pod in remote and/or inaccessible locations while the helicopter is in the hover flight mode; (4) automatically damp any oscillatory and/or twisting motions of the equipment pod during deployment or recovery in the hover flight mode; (5) permit utilization of the equipment pod in remote and/or inaccessible locations from a landed helicopter; (6) electrically isolate the equipment pod from any static charge buildup on the helicopter; and (7) provide for emergency jettison of the equipment pod.

The AHP system of the present invention is configured for use in integrated combination with an external stores support station of a helicopter. The equipment pod may be externally shaped to maximize the internal equipment storage space available while providing an aerodynamic profile that reduces drag effects during helicopter flight operations and the effects of steady/transient wind conditions during downloading or recovery operations. Internally, the equipment pod has an equipment storage space that may be partitioned off into a plurality of compartments that are utilized for the removable storage of mission equipment and/or supplies. A support truss that includes load brackets is positioned within the storage space and functions as the interface structural member for integrating the equipment pod in combination with the DCWR assembly.

One preferred embodiment of the DCWR assembly for the AHP system of the present invention includes a winch subassembly and a suspension/release rack. The suspension rack is configured to provide the mechanical and functional interface between the winch subassembly and the equipment pod, and is utilized to lock the equipment pod in combination with the DCWR assembly in the up-loaded position or to release the equipment pod from the DCWR assembly after deployment. The winch subassembly provides the mechanical and functional interface between the suspension rack and the external stores support station of the helicopter, and is operative in response to pilot commanded signals to deploy or recover the equipment pod, suspension rack combination.

The winch subassembly includes a winch housing, a pair of cable drums, a lead-screw associated with the cable drums, a pair of cables wound on respective cable drums, a pair of cable guides disposed in combination with the lead-screw and respective cables, a drum drive device, static load stabilizers, and a pair of isolation links. An isolation link is secured in rigid combination with the free end of each cable to isolate any static electricity charge buildup on the helicopter from the suspension rack, equipment pod combination.

The static load stabilizers are utilized to align the equipment pod in azimuth and elevation in the up-loaded position to minimize induced drag effects during flight operations. The winch housing is rigidly secured to the external stores support station of the helicopter. The cable drums and the lead-screw are mounted in rotatable combination with the winch housing. The cable guides are mounted for synchronized translation along the lead-screw to ensure that the cables wind/unwind smoothly on respective cable drums without overlapping and/or binding.

The drum drive device provides synchronized rotation of the cable drums and the lead-screw for coordinated winding/unwinding of the cables for deployment or recovery of the equipment pod, release rack combination in a stabilized manner. The drum drive device comprises a drive motor and a high ratio gear train that eliminates the need for a clutch or brake in the drum drive device. The torque developed by the drive motor causes synchronized rotation of the the cable drums and the lead-screw and synchronized translation of the cable guides.

The cable guide includes a cable bore to control the feed of the cable therethrough and a lead-screw housing to control the movement of the cable guide vis-a-vis the lead-screw. A servo controlled cable centering device is mounted within each cable guide to automatically stabilize the dual cables during deployment or recovery of the equipment pod, i.e., damp oscillations and/or twisting motions of the equipment pod. Also disposed within the cable guide are a locking mechanism for locking the equipment pod, suspension rack combination in the up-loaded position to preclude inadvertent deployment of the equipment pod, and a jettison mechanism that allows the equipment pod, suspension rack combination to be jettisoned from the helicopter at any time during emergencies.

The suspension/release rack includes a pair of engagement brackets for securing the suspension rack to the isolation links of the winch subassembly, a lever locking arm mechanism, and an emergency release mechanism. The lever locking arm mechanism may be manually actuated to lock the suspension rack in combination with the equipment pod for up-loading or recovery, or to release the equipment pod from the suspension rack after deployment. The lever arm locking mechanism is configured and arranged so that the locked position cannot be attained unless the load brackets of the equipment pod are engaged. The emergency release mechanism interacts with the lever locking arm mechanism to provide an alternative means for releasing the equipment pod from the suspension rack.

The operating procedures for the AHP system include up-loading, deployment, and recovery of the equipment pod. The DCWR assembly may be utilized to up-load the equipment pod, thereby eliminating the need for sophisticated ground support equipment and minimizing the labor and time required for up-loading. The up-loading procedure, which may be mode implemented with the helicopter in a hover flight guide locking mechanism, actuating the winch subassembly to down winch the suspension rack onto the equipment pod, actuating the lever locking arm mechanism to lock the suspension rack in combination with the equipment pod, actuating the winch subassembly to up winch the suspension rack, equipment pod combination into the up-loaded position, and actuating the cable guide locking mechanism to lock the suspension rack, equipment pod combination in the up-loaded position.

One deployment procedure for a helicopter in a hover flight mode or landed comprises the steps of unlocking the cable guide locking mechanism, actuating the winch subassembly to down winch the suspension rack, equipment pod combination, and actuating the lever locking arm mechanism to release the equipment pod from the suspension rack. The winch subassembly may then be actuated to up winch the suspension rack into the up-loaded position where it is locked in combination with the winch subassembly so that the helicopter is ready for normal flight operations. Mission ground support personnel may access the deployed equipment pod and utilize the mission specific contents of the equipment pod to complete the mission profile. Alternatively, mission ground support personnel may access the mission equipment pod in an up-loaded position from a landed helicopter.

The recovery procedure is utilized to recover the equipment pod after completion of the mission profile. The steps of the recovery procedure are the same as the up-loading procedure.

BRIEF DESCRIPTION OF THE DRAWINGS

A more complete understanding of the present invention and the attendant features and advantages thereof may be had by reference to the following detailed description of the invention when considered in conjunction with the following drawings wherein.

DETAILED DESCRIPTION OF PREFERRED EMBODIMENTS

Figure 1:
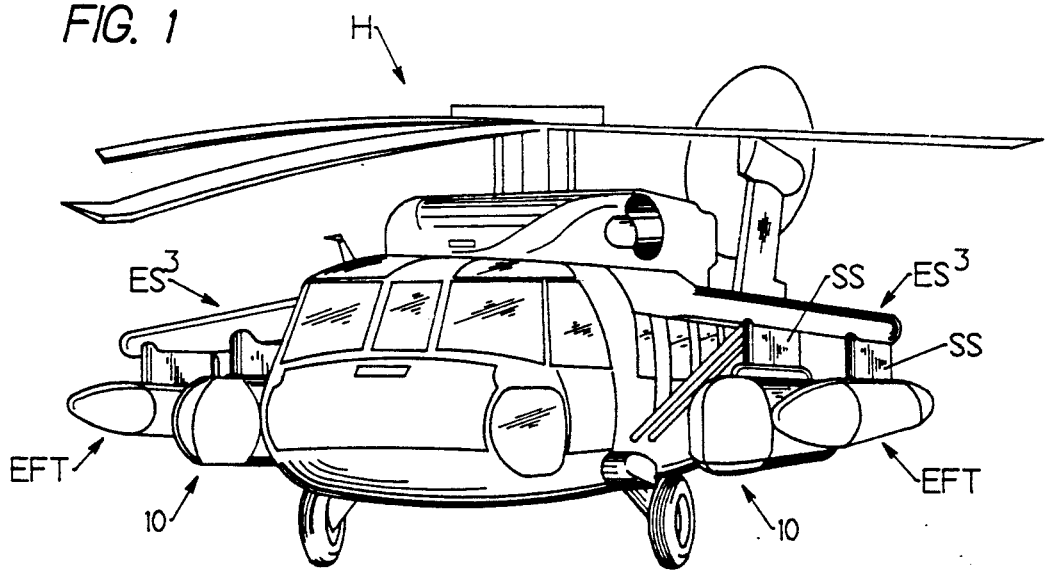
FIG. 1 is a perspective view illustrating an autonomous, heliborne-mobile construction/emergency pod (AHP) system according to the present invention integrated in combination with a UH-60L BLACK HAWK TM (registered trademark of the Sikorsky Aircraft Division of United Technologies Corporation) helicopter.
Figure 2:
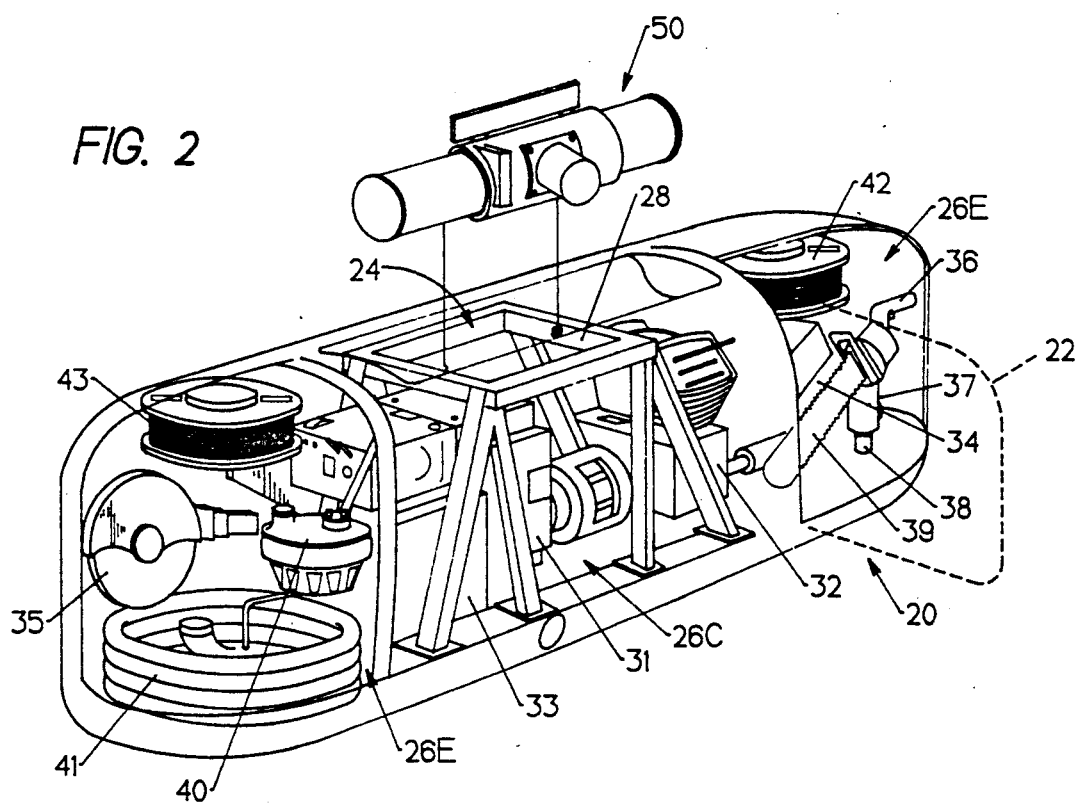
FIG. 2 is stand-alone schematic perspective of the AHP system of FIG. 1.

Referring now to the drawings wherein like reference numerals indicate corresponding or similar elements throughout the several views, FIGS. 1, 2 illustrate an autonomous, heliborne-mobile construction/emergency pod (AHP) system 10 according to the present invention that includes an equipment pod 20 and a dual cable winch and rack (DCWR) assembly 50. The AHP system 10 of the present invention is configured to optimally utilize the characteristics and capabilities of helicopters to efficiently and expeditiously deploy a full complement of mission specific equipment and any associated self-contained power unit and/or supplies for a wide variety of emergency mission profiles, e.g., rescue and/or recovery operations involving downed aircraft, wrecked vehicles such as cars, trucks, buses, trains, disabled ships or boats, collapsed structures such as bridges, buildings, power lines, etc., as well as other disasters that may arise from natural phenomena such as earthquakes, hurricanes, floods, thunderstorms, high winds, etc, in various locations, especially remote and/or inaccessible areas. The AHP system 10 of the present invention also has utility for construction and/or demolition mission profiles including the provisioning of construction and/or demolition operations in combat zones.

More specifically, the equipment pod 20 is configured to facilitate provisioning of remote and/or inaccessible locations with a suitable selection of mission specific equipment and associated power source(s) and/or supplies (e.g., food, clothing, spare parts, medical gear) where other type of provisioning means are impractical or infeasible. The equipment pod 20 may be configured to include a self-contained power source that provides the capability for extended, autonomous emergency or construction mission operations without external support.

The DCWR assembly 50 provides the structural and functional interface between the equipment pod 20 and the helicopter, and combines the structural and functional advantages of a winch system and a standard stores station SS while minimizing or eliminating the disadvantages thereof. The DCWR assembly 50 is configured to: (1) facilitate uploading of the equipment pod 20 in combination with the helicopter with minimal ground support personnel and equipment; (2) lock the equipment pod 20 in secured combination with the helicopter such that the helicopter may fly a normal flight envelope, including nap-of-the earth flight operations; (3) facilitate deployment and/or recovery of the equipment pod 20 in remote and/or inaccessible locations while the helicopter is in the hover flight mode; (4) automatically damp any oscillatory and/or twisting motions of the equipment pod 20 during downloading or recovery in the hover flight mode; (5) permit utilization of the equipment pod 20 in remote and/or inaccessible locations from a landed helicopter; (6) electrically isolate the equipment pod 20 from any static charge buildup on the helicopter; and (7) provide for emergency jettison of the equipment pod 20.

Figure 3:
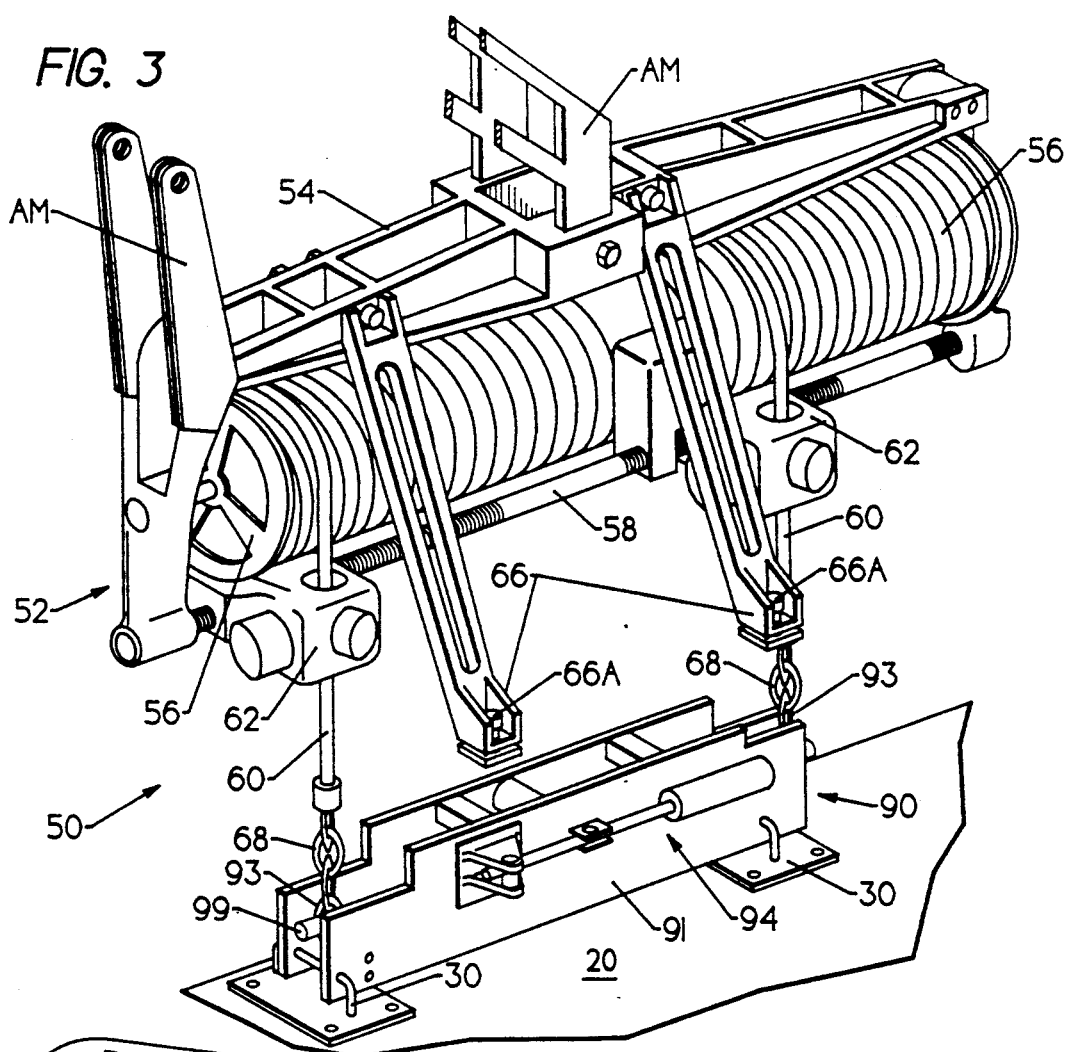
FIG. 3 is a perspective view of a dual cable winch and rack (DCWR) assembly for the AHP system of the present invention.
Figure 4:
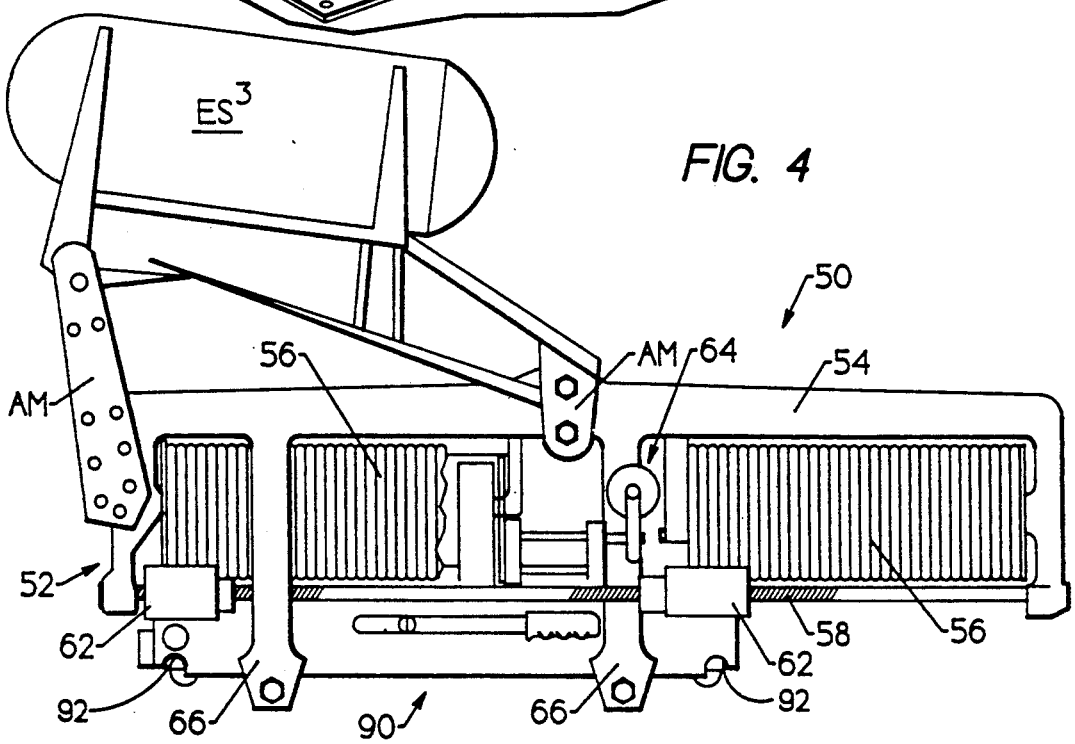
FIG. 4 is a plan view of the DCWR assembly of FIG. 3.

With reference to FIGS. 1, 3, 4, the AHP system 10 of the present invention is illustrated in integrated combination with the attachment members AM of an external stores support station $ES^3$ of a helicopter H. The helicopter H illustrated in FIG. 1 is a UH-60L BLACK HAWK TM (registered trademark of the Sikorsky Aircraft Division of United Technologies Corporation) which has been certified for use with an external stores support station $ES^3$ configuration that provides four external stores stations SS (two per side). Each store station SS is capable of carrying a single 3,000 pound load. As depicted in FIG. 1, the BLACK HAWK TM helicopter H may be configured with two AHP systems 10 (one on each inboard store station SS) and a pair of 230 gallon external fuel tanks EFT (one on each outboard store station SS). In this configuration, the BLACK HAWK TM helicopter H has a take-off weight of about 22,000 pounds (which includes a flight crew of three and up to eleven mission support personnel and/or an equivalent weight in auxiliary equipment or supplies), a maximum mission range of about 250 nautical miles (including about 30 minutes of on-station hover time), and a dash speed of about 130 knots.

An exemplary embodiment of an equipment pod 20 for the AHP system 10 according to the present invention is illustrated in FIG. 2. The equipment pod 20 is preferably fabricated from lightweight, high strength materials such as high impact plastics, composites, or aluminum so that the equipment pod 20 can withstand the forces and shocks associated with helicopter mission operations including flight operations, uploading, downloading, recovery, and handling during ground operations. Latched doors 22 provide internal access to the equipment pod 20.

Externally, the equipment pod 20 may be shaped to maximize the internal equipment storage space available while providing an aerodynamic profile that reduces drag effects during helicopter flight operations and the effects of steady/transient wind conditions during downloading or recovery operations. The external dimensions of the exemplary embodiment illustrated in FIG. 2 include a length of about 134 inches, a width of about 26 inches, and a height of about 37 inches. One skilled in the art will appreciate that equipment pods 20 having other external dimensions may be utilized, depending upon the lift capability of the helicopter H, the location of the stores station SS, and/or the weight and/or shape of the equipment and/or supplies required by a specific mission profile.

Internally, the equipment pod 20 has an equipment storage space 24 that may be partitioned off into a plurality of compartments, e.g., a center compartment 26C and end compartments 26E as illustrated in FIG. 2, that are utilized for the removable storage of mission equipment and any required power source(s) and/or supplies. A high strength support truss 28 is optimally positioned within the storage space 24 for weight and balance, and is rigidly secured in combination with structural members of the equipment pod 20. The support truss 28 functions as the interface structural member for integrating the equipment pod 20 in combination with the DCWR assembly 50. Rigidly secured to the support truss 28 are a pair of spaced-apart "U"-shaped load brackets 30 that function as the attachment points for integrating the equipment pod 20 in combination with the DCWR assembly 50.

One skilled in the art will appreciate that the storage space 24 of the equipment pod 20 may be configured with any one of many diverse partition plans depending upon the specific mission profile. Likewise, a wide variety of mission equipment and/or supplies, again depending upon the specific mission profile, may be removably stored within the storage space 24 of the equipment pod 20.

By way of illustration, the storage space 24 of the exemplary equipment pod 20 illustrated in FIG. 2 includes a central compartment 26C and adjacent end compartments 26E. The composition of the mission equipment removably stored therein is representative of a combat construction mission profile. Stored within the central compartment 26C are an alternator/electric start diesel power unit 31, an air compressor 32, and a hydraulic pump 33. The diesel power unit 31, which includes a self-contained fuel supply such as JP-8 fuel, provides the necessary power for operating the air compressor 32, the hydraulic pump 33, and/or generating electrical power for extended periods of time (up to about 8 hours). The power unit 31 provides the capability for independent operation of power actuated mission equipment in disaster or construction locations that lack indigenous power sources. Alternatively, the auxiliary power drive system of the BLACK HAWK TM helicopter H may be used to provide the necessary power take-offs for operating the air compressor 32, the hydraulic pump 33, and/or generating electrical power, thereby supplementing the equipment pod 20 power source by up to four times its self-contained power.

Power actuated construction equipment such as a cut-off saw 34, a grinder 35, impact wrenches 36, a chain saw 37, a hammer drill 38, and a jack hammer 39 may be removably stored in the end compartments 26E. Such mission equipment may be electrically powered, hydraulically actuated and/or pneumatically actuated. Other miscellaneous construction equipment such as a water pump 40, a trash pump with hoses 41, emergency lighting 42, and self-retracting hoses 43 may also be removably stored in the end compartments 26E. Individual tools comprising the power actuated construction equipment may be removed from the compartments, interfaced with the appropriate power take-offs, and operated as necessary to fulfill the mission profile.

An equipment pod 20 having the external dimensions and loaded with the complement of combat construction equipment as described in the preceding paragraphs has a gross weight of about 1400 pounds. It will be appreciated that the equipment pod 20 may be configured and loaded to accommodate higher (or lower) gross weights as required, based upon the load carrying capability of the external stores support station $ES^3$ (about 3000 pounds for the BLACK HAWK TM as described hereinabove) less the weight of the DCWR assembly 50.

One preferred embodiment of the DCWR assembly 50 for the AHP system 10 of the present invention is depicted in FIGS. 3, 4 and includes a winch subassembly 52 and a suspension/release rack 90. The suspension rack 90 is configured to provide the mechanical and functional interface between the winch subassembly 52 and the equipment pod 20. The suspension rack 90 is operative to: (1) lock the equipment pod 20 in combination therewith for up-loading or recovery operations, i.e., in combination with the DCWR assembly 50, and (2) release the equipment pod 20 from the DCWR assembly 50 after deployment, as described in further detail hereinbelow. The winch subassembly 52 is configured to provide the mechanical and functional interface between the suspension rack 90 and the external stores support station $ES^3$ of the helicopter H. The winch subassembly 52 is operative in response to pilot commanded signals to deploy and/or recover, i.e., down winch and/or up winch, the equipment pod 20, release rack 90 combination and/or the suspension rack 90 alone, as described hereinbelow in further detail.

The winch subassembly 52 includes a winch housing 54, a pair of cable drums 56, a lead-screw 58 associated with the cable drums 56, a pair of cables 60 wound on respective cable drums 56 and having one end thereof secured thereto, a pair of cable guides 62 disposed in combination with the lead-screw 58 and respective cables 60, a drum drive device 64, static load stabilizers 66, and a pair of isolation links 68. An isolation link 68 is secured in rigid combination with the free end of each cable 60. The isolation link 68 is formed from a high strength, non-conductive material such as a non-conductive composite material. The isolation link 68 is operative to isolate any static electricity charge buildup on the helicopter H from the suspension rack 90, equipment pod 20 combination.

For the embodiment illustrated, four static load stabilizers 66 are disposed in combination with the winch housing 54 (two per side) and are operative to abuttingly engage the equipment pod 20 (see FIG. 5A) to align the equipment pod 20 in azimuth and elevation in the up-loaded position to minimize induced drag effects during flight operations. The static load stabilizers 66 may include adjustable alignment screws 66A for fine aligning of the equipment pod 20.

The winch housing 54 is bolted in combination with the attachment members AM of an external stores support station $ES^3$ to rigidly secure the winch subassembly 52 in combination with the helicopter H. Opposed ends of each cable drum 56 and the associated lead-screw 58 are mounted in rotatable combination with the winch housing 54. The pair of cable guides 62 are mounted for synchronized translation along the lead-screw 58 to ensure that the cables 60 wind/unwind smoothly on respective cable drums 56 without overlapping and/or binding.

Figure 5A:
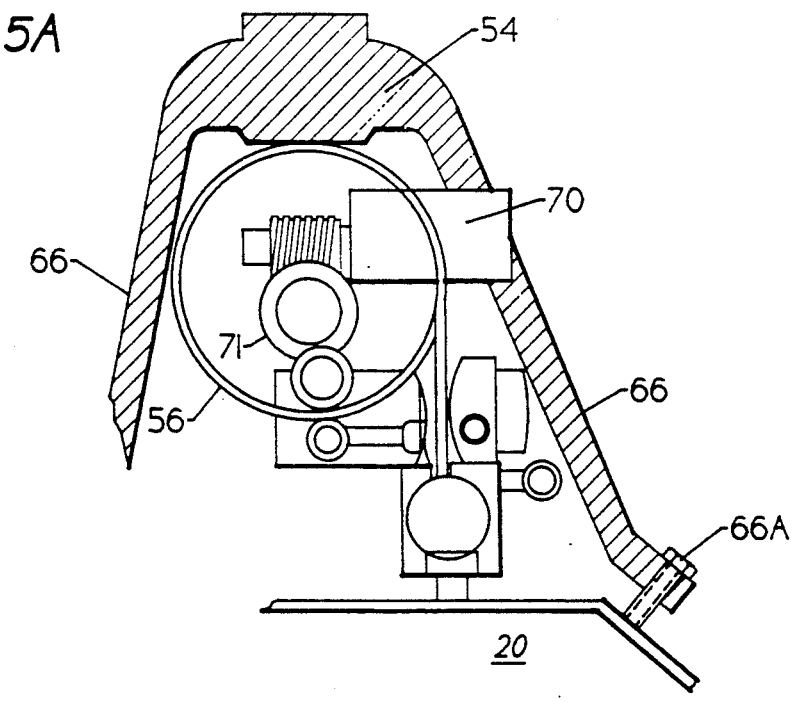
FIG. 5A is a partial plan view of the DCWR assembly of FIG. 3.
Figure 5B:
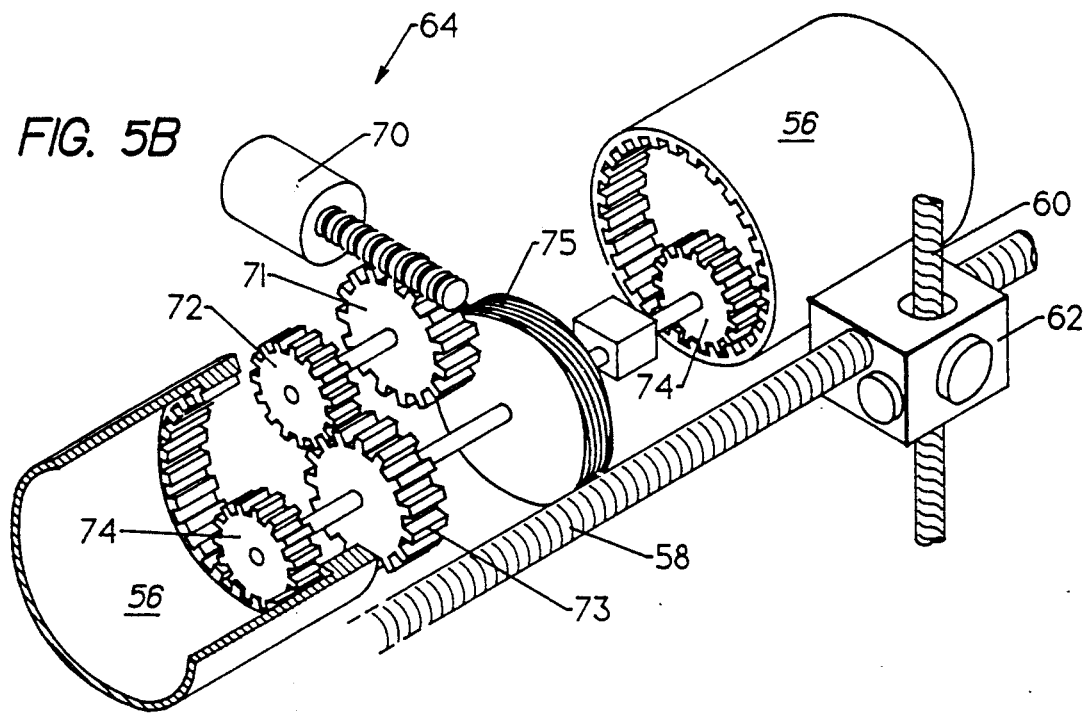
FIG. 5B is a schematic perspective view of a drive device for the DCWR assembly of FIG. 3.

With reference to FIGS. 5A, 5B, the drum drive device 64 is mounted in combination with the winch housing 54 and is operative to provide synchronized rotation of the cable drums 56 and the associated lead-screw 58. The synchronized rotation of the cable drums 56 and the lead-screw 58 provides coordinated winding/unwinding of the cables 60 so that the equipment pod 20, suspension rack 90 combination is deployed or recovered in a stabilized manner. The drum drive device 64 comprises a drive motor 70 and a high ratio gear train that includes a primary drive gear 71, a primary driven gear 72, a secondary drive gear 73, a pair of drum drive gears 74 and a screw drive gear 75. The high gear ratio of the gear train, in the range of about 600 to 1,000:1 for the embodiment described herein, precludes unpowered movement of the cable drums 56 with the equipment pod 20, suspension rack 90 combination attached to the dual cables 60, thereby eliminating the need for a clutch or brake in the drum drive device 64.

The drive motor 70 is a switch reluctance type motor that is operated by means of power routed from the helicopter H. For the particular embodiment of the AHP system 10 described hereinabove, with an equipment pod 20 gross weight of about 1400 pounds, the drive motor 70 generates a 50 HP output at 50,000 RPMs which is sufficient to support the high gear ratio of the drum drive device 64 gear train for deployment (as well as up-loading and recovery) of the equipment pod 20, suspension rack 90 combination.

The torque developed by the drive motor 70 is mechanically coupled to the secondary drive gear 73 by means of the primary drive gear 71 and the primary driven gear 72. The secondary drive gear 73 simultaneously drives the drum gears 74 and the screw gear 75 to synchronize the rotational motion between the cable drums 56 and between the cable drums 56 and the lead-screw 58, respectively. The synchronization of rotational motion between the cable drums 56 and the lead-screw 58 effectively synchronizes the translational motion of the cable guides 62 with the rotational motion of the cable drums 56.

Figure 6:
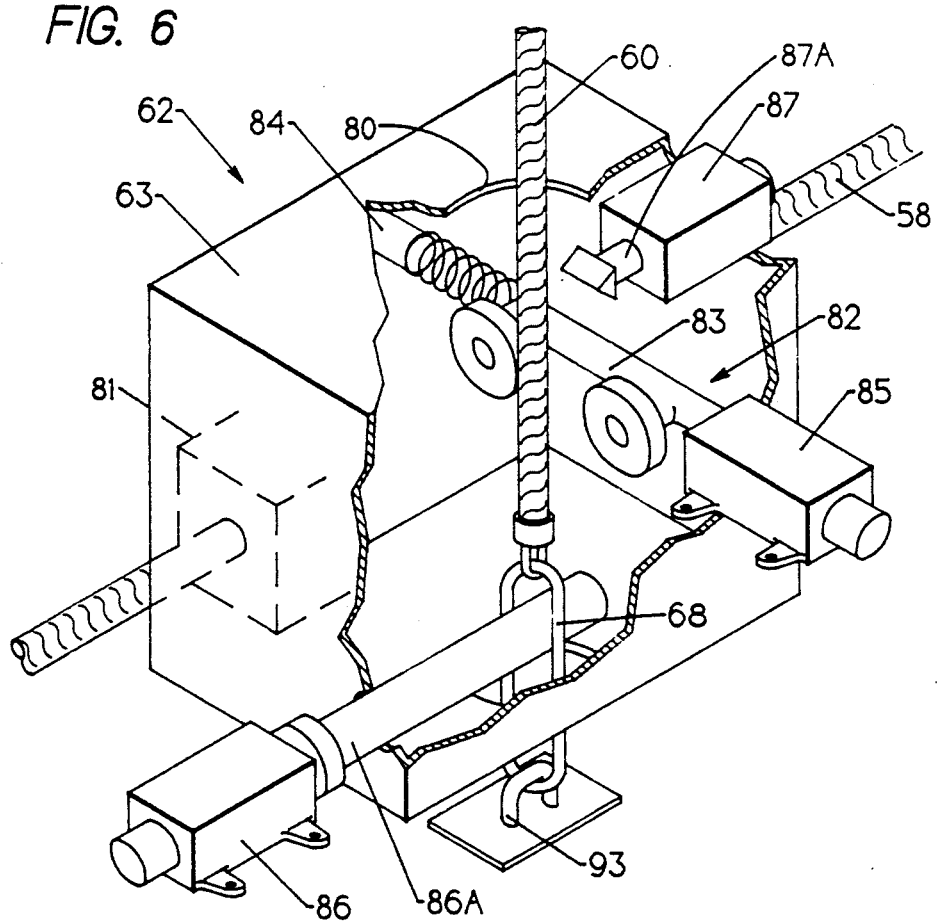
FIG. 6 is a schematic perspective view of a cable guide for the DCWR assembly of FIG. 3.

An exemplary cable guide 62 for the winch subassembly 52 is illustrated in FIG. 6. A cable bore 80 is formed through the cable guide housing 63 to control the feed of the cable 60 through the cable guide 62, thereby ensuring that the cable 60 is wound/unwound smoothly on the cable drum 56 without overlapping or binding. A lead-screw housing 81, disposed within the guide housing 63, contains the lead-screw 58 and controls the translational movement of the cable guide 62 vis-a-vis the lead-screw 58.

A servo controlled cable centering device 82 is mounted within each guide housing 63 to automatically stabilize the dual cables 60 during deployment or recovery of the equipment pod 20, suspension rack 90 combination or the suspension rack 90 alone, i.e., damp oscillations and/or twisting motions of the equipment pod 20, suspension rack 90 combination or the suspension rack 90 alone. The cable centering device 82 includes at least one pair of cable angle sensors 83 mounted in opposed relation with respect to the cable 60, a corresponding centering means 84 such as a hydraulically actuated spring that is operative to exert a restoring force against the cable 60, and a means 85 such as a piston coupled to the cable angle sensors 83 and operative to actuate the centering means 84. Oscillatory and/or twisting motions experienced by the equipment pod 20 cause a corresponding displacement of one or both of the cables 60 from a neutral position. This differential displacement is sensed by the cable angle sensors 83 which generate a signal corresponding to the differential cable displacement that activates the means 85. The means 85 generates a restoring signal that activates the centering means 84 to exert a restoring force against the cable 60 to return the cable 60 to the neutral position, i.e., any oscillatory or twisting motion of the equipment pod 20, suspension rack 90 combination or the suspension rack 90 alone is effectively dampened.

Also disposed within the housing 63 of the cable guide 62 are a locking mechanism 86 and a jettison mechanism 87. The locking mechanism 86 is operative to lock the equipment pod 20, suspension rack 90 combination (or the suspension rack 90 alone) in the up-loaded position, thereby allowing the helicopter to utilize its full flight envelope. The locking mechanism 86 is further operative to release the equipment pod 20, suspension rack 90 combination for deployment of the equipment pod 20. The locking mechanism 86 is operative in response to a lock signal generated by the pilot to extend a locking pin 86A through the isolation link 68, thereby securing the equipment pod 20, suspension rack 90 combination (or the suspension rack 90 alone) in the up-loaded position in engagement with the winch subassembly 52. To initiate the deployment process, the pilot generates an unlock signal that retracts the locking pin 86A from the isolation link 68 so that the equipment pod 20, suspension rack 90 combination may be disengaged from the winch subassembly 52 by down winching the cables 60.

The jettison mechanism 87 is operative to allow the equipment pod 20, suspension rack 90 combination to be jettisoned from the helicopter H at any time during emergencies, i.e., from the up-loaded position, during deployment, or during recovery, by simultaneously severing the dual cables 60. The jettison mechanism 87 is operative in response to a jettison signal generated by the pilot to activate a cutting pin 87A (for example, by means of an explosive charge) that severs each cable 60, thereby jettisoning the equipment pod 20, suspension rack 90 combination from the winch subassembly 52. To ensure a successful jettison with the equipment pod 20, suspension rack 90 combination locked in the up-loaded position, the jettison signal will cause the unlock signal for the locking mechanism 86 to be implemented immediately prior to the jettison signal. This sequence ensures that the equipment pod 20, suspension rack 90 combination does not hang up on the extended locking pins 86A.

The suspension/release rack 90 includes a housing 91 having a pair of attachment slots 92, a pair of "U"-shaped engagement brackets 93, a lever locking arm mechanism 94, and an emergency release mechanism 99. The attachment slots 92 are configured to position the load brackets 30 of the equipment pod 20 within the housing 91 with the equipment pod 20 in the up-load position. The "U"-shaped engagement brackets 93 are rigidly secured to the housing 91 and are engaged with respective isolation links 68 (see FIGS. 3, 6) to secure the suspension rack 90 in combination with the winch subassembly 52.

Figure 7:
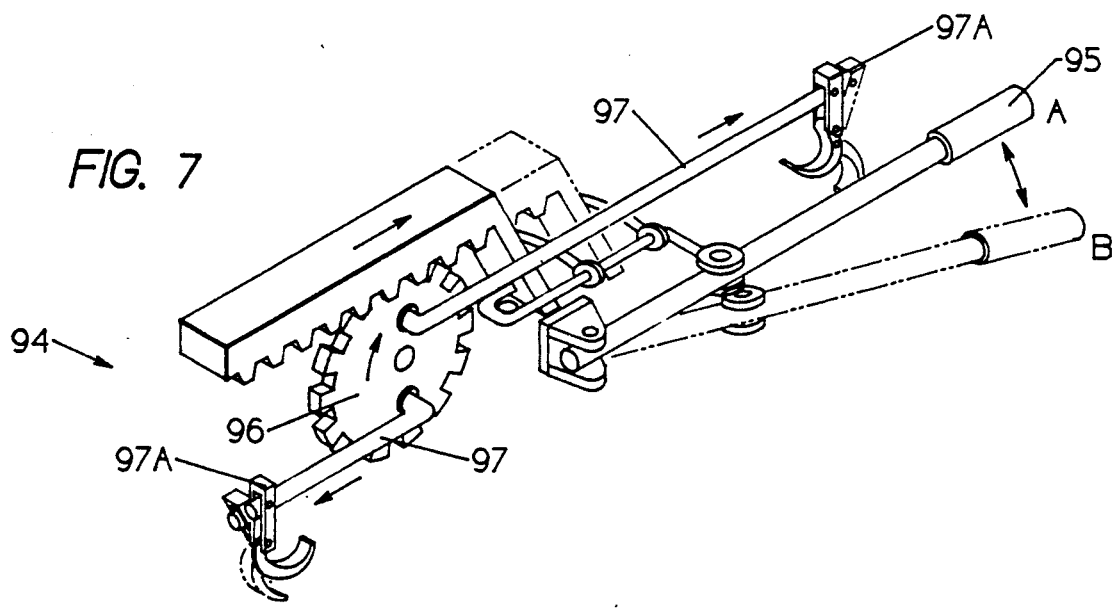
FIG. 7 is a schematic perspective view of a lever locking arm mechanism for the DCWR assembly of FIG. 3.

Referring to FIG. 7, the lever locking arm mechanism 94 may be manually actuated to lock the suspension rack 90 in combination with the equipment pod 20 for up-loading or recovery operations (position A). Alternatively, the lever locking arm mechanism 94 may be manually actuated to release the equipment pod 20 from the suspension rack 90 after deployment (position B). The lever locking arm mechanism 94 includes an actuating handle 95 mounted for rotation with respect to an external wall of the housing 91, a rotatable gear member 96 mounted within the housing 91 and mechanically coupled to the actuating handle 95, and a pair of locking arms 97 secured to the rotatable gear member 96. The ends of the respective locking arms 97 include latching pawls 97A.

Movement of the actuating handle 95 to the locked position (position A) causes rotation of the gear member 96 to extend the locking arms 97 so that the latching pawls 97A engage the load brackets 30 of the equipment pod 20, thereby locking the suspension rack 90 in combination with the equipment pod 20. The lever arm locking mechanism 94 is configured and arranged so that the actuating handle 95 cannot be moved to the locked position unless both latching pawls 97A are engaging the load brackets 30. Movement of the actuating handle 95 to the release position (position B) causes rotation of the gear member 96 to retract the locking arms 97 so that the latching pawls 97A disengage the load brackets 30 of the equipment pod 20, thereby releasing the equipment pod 20 from the suspension rack 90.

The emergency release mechanism 99 interacts with the lever locking arm mechanism 94 to provide an alternative means for releasing the equipment pod 20 from the suspension rack 90. The emergency release mechanism 99 is a solenoid operated device that interacts with the rotatable gear member 96 in such a manner that when activated, the rotatable gear member 96 is caused to rotate to the release position such that the locking pawls 97A are disengaged from the load brackets 30 of the equipment pod 20, thereby releasing the equipment pod 20 from the suspension rack 90.

The operating procedures for up-loading, deployment, and recovery utilizing the AHP system 10 of the present invention are described in the following paragraphs. The DCWR assembly 50 may be utilized to up-load the equipment pod 20, thereby eliminating the need for sophisticated ground support equipment and minimizing the labor and time required for up-loading operation. Loaded equipment pods 20 may be stored on carts or dollies, which may be utilized to position an equipment pod 20 for up-loading. After unlocking the locking mechanism 86, the winch subassembly 52 may be actuated to down winch the suspension rack 90 onto the equipment pod 20. The lever locking arm mechanism 94 is manually actuated to lock the suspension rack 90 in combination with the equipment pod 20. The winch subassembly 52 is then actuated to up winch the suspension rack 90, equipment pod 20 combination into the up-loaded position, and the locking mechanism 86 is actuated to lock the suspension rack 90, equipment pod 20 combination in the up-loaded position, i.e., in integrated combination with the external stores support station ES$^3$. The static load stabilizers 66 are adjusted as necessary to align the equipment pod 20 for flight operations. With the suspension rack 90, equipment pod 20 combination locked in the up-loaded position, the helicopter H may utilize its full flight envelope during the mission flight, including nap-of-the earth flight. The AHP system 10 of the present invention also facilitates up-loading of an equipment pod 20 with the helicopter H in a hover flight mode.

To deploy the equipment pod 20 from a helicopter H in the hover flight mode over a predetermined ground location, the pilot generates an unlock signal that activates the locking mechanism 86 so that the locking pins 86A are retracted from the isolation links 68. The winch subassembly 52 is then actuated to down winch the suspension rack 90, equipment pod 20 combination. During down winching, the servo controlled cable centering devices 82 of each cable guide 62 are operative to maintain the suspension rack 90, equipment pod 20 combination in a stabilized position. Once the suspension rack 90, equipment pod 20 combination has been down winched onto the ground, the lever locking arm mechanism 94 is actuated to release the equipment pod 20 from the suspension rack 90.

The winch subassembly 52 may be subsequently actuated to up winch the suspension rack 90 into the up-loaded position. A lock signal activates the locking mechanism 86 to lock the suspension rack 90 in combination with the winch subassembly 52 so that the helicopter H is ready for normal flight operations. Mission support personnel may access the deployed equipment pod 20 and utilize the mission specific contents of the equipment pod 20 to complete the mission profile.

The deployment procedure for an equipment pod 20 from a landed helicopter H and the recovery procedure for an equipment pod 20 after completion of the mission profile (with the helicopter H either landed or in a hover flight mode) are the same as the deployment and up-load procedures, respectively, described in the preceding paragraphs. In addition, the equipment pod 20 may be accessed by mission personnel from a landed helicopter H with the equipment pod 20 in the up-loaded position.

A wide variety of modifications and variations of the present invention are possible in light of the above teachings. For example, while the AHP system has been described in terms of a UH-60L BLACK HAWK TM helicopter H, it will be appreciated that the AHP system may be utilized in almost any helicopter that has been, or could be, certified for use with external stores support stations. And, while the above disclosure described and illustrated external stores support stations that were lateral extensions from the sides of the helicopter, the AHP system may also be utilized with a centerline external stores support station. It will also be appreciated that the DCWR assembly 50 that comprises part of the AHP system 10 of the present invention has utility for up-loading and deployment of conventional mission stores such as missiles, bombs, or auxiliary fuel tanks. It is therefore to be understood that, within the scope of the appended claims, the present invention may be practiced otherwise than as specifically described hereinabove.

What is claimed is:

1. An autonomous, heliborne-mobile pod system configured for use on a helicopter having an external stores support station, comprising:

equipment pod means for provisioning ground personnel with mission equipment, said equipment pod means being configured for internal storage of the mission equipment; and dual cable winch and rack assembly means for integrating said equipment pod means in combination with the external stores support station of the helicopter wherein the helicopter may fly a normal flight envelope, said dual cable winch and rack assembly means including a winch subassembly operative for up winching said equipment pod means for up-loading thereof, for down winching said equipment pod means for deployment thereof, and for up winching deployed equipment pod means for recovery thereof, means for rigidly securing said winch subassembly in combination with the external stores support station of the helicopter, and a suspension rack secured in combination with said winch subassembly, said suspension rack including means for locking said equipment pod means in combination with said suspension rack to up-load and recover said equipment pod means by operation of said winch assembly, said locking means being further operative for releasing said equipment pod means from said suspension rack after deployment thereof by operation of said winch assembly.

2. The autonomous, heliborne-mobile pod system of claim 1 wherein said locking means of said suspension rack is a manually operable lever locking arm mechanism that is operative in a first position to lock said equipment pod means in combination with said suspension rack and that is operative in a second position to release said equipment pod means from said suspension rack, said manually operable lever locking arm mechanism being manually operable for locking said equipment pod means in combination with said suspension rack only with said suspension rack and said equipment pod means in predetermined alignment.

3. The autonomous, heliborne-mobile pod system of claim 1 wherein said winch subassembly further includes a locking mechanism, operative in response to a lock signal from the helicopter, for locking said suspension rack in combination with said winch subassembly in an up-loaded position and wherein said locking mechanism is further operative in response to an unlock signal from the helicopter for releasing said suspension rack from said winch subassembly for deployment of said suspension rack.

4. The autonomous, heliborne-mobile pod system of claim 1 wherein said winch subassembly further includes a jettison mechanism, operative in response to a jettison signal from the helicopter, for jettisoning said suspension rack from said winch subassembly.

5. The autonomous, heliborne-mobile pod system of claim 1 wherein said winch subassembly further includes isolation link means for securing said suspension rack in combination with said winch subassembly, said isolation link means being further operative for electrically isolating said suspension rack from static charge buildup on the helicopter.

6. The autonomous, heliborne-mobile pod system of claim 1 wherein said winch subassembly includes a pair of rotatable cable drums, each said cable drum having a cable with one end secured thereto and wherein the other end of each said cable secures said suspension rack in combination with said winch subassembly.

7. The autonomous, heliborne-mobile pod system of claim 6 where said winch subassembly includes a drum drive device for providing power to rotate said pair of cable drums in synchronization for up-loading, deployment, and recovery of said suspension rack.

8. The autonomous, heliborne-mobile pod system of claim 7 wherein said drum drive device includes a high ratio gear train that is operative to preclude unpowered rotation of said pair of cable drums.

9. The autonomous, heliborne-mobile pod system of claim 7 further comprising a cable guide disposed in combination with each said cable drum and wherein said drum drive device provides power to translate said cable guides in synchronization with said synchronized rotation of said pair of cable drums.

10. The autonomous, heliborne-mobile pod system of claim 9 wherein each said cable guide includes a servo controlled cable centering device for damping oscillatory and twisting motions of said suspension rack during deployment and recovery thereof.

11. The autonomous, heliborne-mobile pod system of claim 1 wherein said equipment pod means is internally configured for storing a suitable selection of mission specific power actuated equipment and a self-contained power source therefore wherein said equipment pod means is operative to support extended, autonomous mission operations without external support, and further wherein said equipment pod means is externally configured to provide an aerodynamic profile that reduces drag effects during flight operations of the helicopter.

12. The autonomous, heliborne-mobile pod system of claim 9 wherein each said cable guide further includes a jettison mechanism, said jettison mechanisms being operative in response to a jettison signal from the helicopter for simultaneously severing said respective cable to jettison said suspension rack from said winch subassembly.

13. The autonomous, heliborne-mobile pod system of claim 9 wherein each said cable guide further includes a locking mechanism, said locking mechanisms being operative in response to a lock signal from the helicopter to lock said suspension rack in combination with said winch subassembly in an up-loaded position, said locking mechanisms being further operative in response to an unlock signal from the helicopter to release said suspension rack from said winch subassembly for deployment of said suspension rack.

14. The autonomous, heliborne-mobile pod system of claim 1 wherein said means for rigidly securing said winch subassembly in combination with the external stores support station of the helicopter includes a winch housing, and wherein said winch subassembly includes a pair of cable drums and a lead screw, said pair of cable drums and said lead screw being rotatably mounted in combination with said winch housing.

15. The autonomous, heliborne-mobile pod system of claim 14 further comprising static load stabilizer mans disposed in combination with said winch housing and operative to abuttingly engage said equipment pod means for aligning said equipment pod means in azimuth and elevation in an up-loaded position to minimize induced drag effects during flight operations of the helicopter.

* * * * *